United States Patent
Iwasaki et al.

(10) Patent No.: US 10,020,096 B2
(45) Date of Patent: Jul. 10, 2018

(54) SHIELDED WIRE HARNESS AND METHOD FOR MANUFACTURING THE SAME

(71) Applicant: YAZAKI CORPORATION, Tokyo (JP)

(72) Inventors: Takahiro Iwasaki, Shizuoka (JP); Takuya Sugiyama, Shizuoka (JP); Yoshinobu Akiha, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/452,900

(22) Filed: Mar. 8, 2017

(65) Prior Publication Data

US 2017/0200535 A1    Jul. 13, 2017

Related U.S. Application Data

(60) Division of application No. 14/108,423, filed on Dec. 17, 2013, which is a continuation of application No. PCT/JP2012/003888, filed on Jun. 14, 2012.

(30) Foreign Application Priority Data

Jun. 17, 2011    (JP) ................. 2011-135328

(51) Int. Cl.
| H01R 43/00 | (2006.01) |
| H01B 13/012 | (2006.01) |
| H01B 7/00 | (2006.01) |
| H01B 7/18 | (2006.01) |
| B60R 16/02 | (2006.01) |

(52) U.S. Cl.
CPC ... *H01B 13/01263* (2013.01); *B60R 16/0215* (2013.01); *H01B 7/0045* (2013.01); *H01B 7/1855* (2013.01); *Y10T 29/49194* (2015.01)

(58) Field of Classification Search
CPC ............ H01B 13/01263; H01B 7/0045; H01B 7/1855; B60R 16/0215; Y10T 29/49194
USPC .......... 29/868, 825, 592.1; 174/34, 35 C, 36, 174/72 A, 102 C, 106 R, 107
See application file for complete search history.

(56) References Cited

U.S. PATENT DOCUMENTS 6,119,749 A *  9/2000  Matsuzawa ...... H01B 13/01281
                                                156/353
7,827,678 B2 * 11/2010  Dion ................... H01B 13/262
                                                156/54

(Continued)

FOREIGN PATENT DOCUMENTS

JP        2003031060 A  *  1/2003

*Primary Examiner* — Peter DungBa Vo
*Assistant Examiner* — Azm Parvez
(74) *Attorney, Agent, or Firm* — Metrolexis Law Group, PLLC

(57) ABSTRACT

A method for manufacturing a shielded wire harness, includes: wrapping a conductive sheet around a wire harness in a parallel state to the wire harness, the conductive sheet having a long belt shape along a longitudinal direction of the wire harness, and cutting the conductive sheet in matching with a desired electric wire length; allowing an adhesive surface formed on a back surface side of the protection tape to fix the conductive sheet to the wire harness by spirally winding a long protection tape around an outer circumference of the conductive sheet wrapped around the wire harness; and cutting the protection tape in matching with the desired electric wire length.

6 Claims, 6 Drawing Sheets

(56) References Cited

U.S. PATENT DOCUMENTS

2003/0062177 A1\* 4/2003 Yagi ................ H01R 9/032
174/359
2011/0315419 A1\* 12/2011 Grant ................ H01B 11/06
174/34

\* cited by examiner

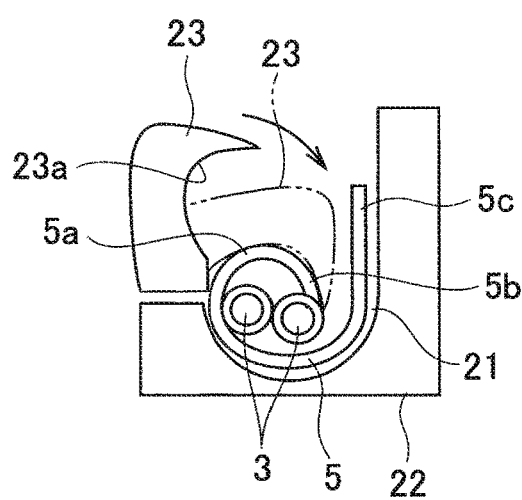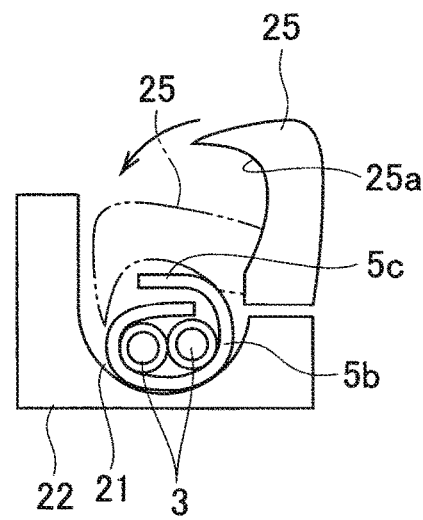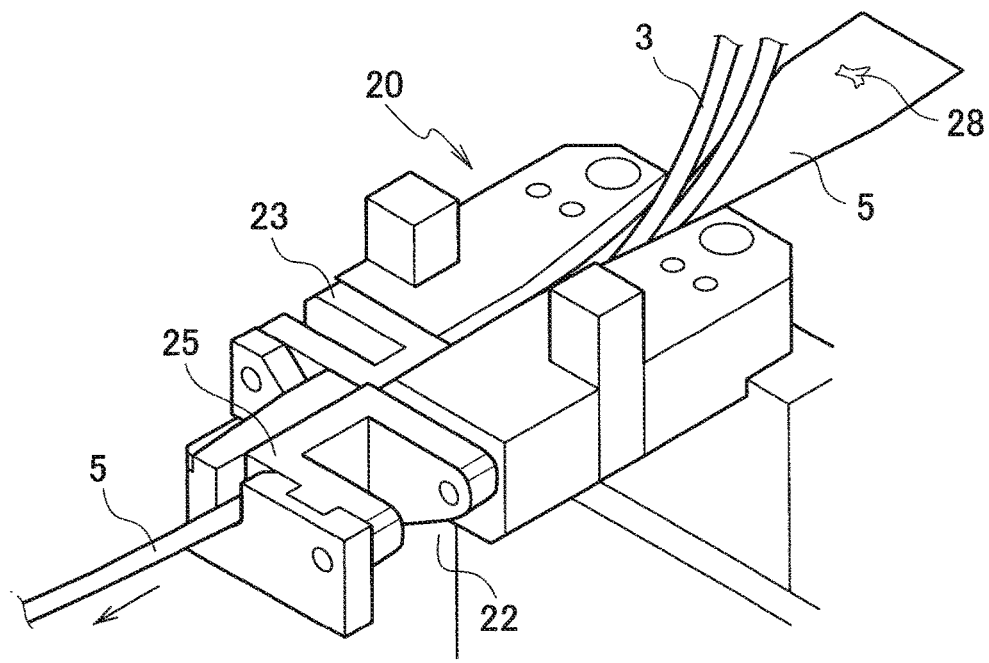

SHIELDED WIRE HARNESS AND METHOD FOR MANUFACTURING THE SAME

CROSS REFERENCE TO RELATED APPLICATIONS

The present application is a divisional of the U.S. application Ser. No. 14/108,423 filed on Dec. 17, 2013, the entire contents of which is incorporated herein by reference. This application is a continuation of International Application No. PCT/JP2012/003888, filed Jun. 14, 2012, and based upon and claims the benefit of priority from Japanese Patent Application No. 2011-135328, filed Jun. 17, 2011, the entire contents of all of which are incorporated herein by reference.

TECHNICAL FIELD

The present invention generally relates to a shielded wire harness wired in a vehicle or the like and a method for manufacturing the same.

BACKGROUND ART

A shielded wire harness is used owing to a necessity to perform an electromagnetic shield for protection from an electromagnetic noise, leakage prevention of the electromagnetic noise, and the like. The shielded wire harness is manufactured by covering a wire harness with an electromagnetic shield material.

A conventional shielded wire harness is fabricated in such a manner that, after a long shield line is fabricated in advance by inserting an electric wire into a braided tube, the shield line is cut into a predetermined length, a terminal is attached onto an end portion of each of the cut shield lines, and both of them are bundled together. The conventional shielded wire harness is incorporated in a shield circuit by being fabricated individually in matching with the shield circuit.

FIG. 1 illustrates a manufacturing apparatus for use in another method for manufacturing the shielded wire harness (refer to PTL 1 (JP 2929846 B)). In the manufacturing apparatus of PTL 1, an electric wire reel 110, a wrapping unit 120, a length measuring unit 130, and a terminal end processing unit 140 are arranged in order along a drawing direction of a covered electric wire 100.

The covered electric wire 100 has a core wire covered with an insulating cover, and is drawn out from a state of being wound around the electric wire reel 110.

The wrapping unit 120 includes: a tape reel 121 that takes up a conductive sheet tape 150; a plurality of guide rollers 122 which guide the conductive sheet tape 150 drawn out from the tape reel 121; and a dice 125 that wraps the conductive sheet tape 150 around the covered electric wire 100. The conductive sheet tape 150 is formed by stacking metal foil such as aluminum foil on a resin sheet. The conductive sheet tape 150 is wrapped around the covered electric wire 100, whereby a shielded electric wire 160 is formed.

The length measuring unit 130 measures a supply length of the shielded electric wire 160.

The terminal end processing unit 140 includes: a front clamp 141 and a rear clamp 142, which are spaced apart from each other; a cutting cutter 143 arranged between these clamps 141 and 142; and notching cutters 144, 145, 146 and 147 arranged on both sides of the cutting cutter 143. The terminal end processing unit 140 performs pretreatment for crimping a terminal to a terminal end of the shielded electric wire 160.

In the manufacturing apparatus of PTL 1, which is illustrated in FIG. 1, the covered electric wire 100 drawn out from the electric wire reel 110 is inserted through the dice 125 of the wrapping unit 120, whereby the conductive sheet tape 150 is wrapped around an outer circumference of the covered electric wire 100, and the shielded electric wire 160 is formed. In the terminal end processing unit 140, in a state where the clamps 141 and 142 clamp the shielded electric wire, the shielded electric wire is cut back and forth by the cutting cutter 143, the notching cutters 144 and 147 notch the conductive sheet tape 150, and the notching cutters 145 and 146 notch the insulating cover of the covered electric wire 100.

In this state, the notching cutters 144 and 147 move in a direction along a supply direction of the wire harness, thereby peel off the conductive sheet tape 150, and expose the covered electric wire 100. Moreover, the notching cutters 145 and 146 move in the direction along the supply direction of the wire harness, thereby peel off the insulating cover from the covered electric wire 100, and expose the core wire. Then, cover a grip portion of the terminal is crimped and attached onto the insulating cover of the covered electric wire 100 from which the conductive sheet tape 150 is peeled off. Moreover, a core wire grip portion of the terminal is crimped and attached onto the core wire of the covered electric wire 100 from which the insulating cover is peeled off. In such a way, the terminal can be connected to the terminal end of the shielded electric wire 160.

SUMMARY OF INVENTION

However, in such a conventional method for manufacturing the shielded wire harness, it is necessary to select sizes and combinations of the electric wires, which correspond to the individual shield circuits, and to individually fabricate the shielded wire harnesses. In the case where types of the shielded wire harness are many, fabrication and management thereof are cumbersome. Moreover, an extruder of a cover with the conductive sheet and a twister of shield wires are necessary, structure of the manufacturing apparatus is complicated, and control and operation thereof are troublesome. Furthermore, it is difficult to automate terminal end treatment such as the attachment of the terminal and the insertion thereof into a connector, and there is a problem that man-hours for processing are increased in the event of the automation.

In the manufacturing apparatus of the shielded wire harness, which is illustrated in FIG. 1, the wrapping unit 120 and the terminal end processing unit 140 are necessary, and the whole of the apparatus is complicated. Therefore, the control and operation of the manufacturing apparatus are troublesome, and there is a problem that processing cost rises.

In this connection, it is an object of the present invention to provide a shielded wire harness easy to manufacture, and to provide a manufacturing method capable of easily fabricating such a shielded wire harness with structure in which a conductive sheet covers a wire harness.

A shielded wire harness according to a first aspect of the present invention includes: a wire harness; a conductive sheet to be wrapped around the wire harness in a parallel state to the wire harness, the conductive sheet having a long belt shape along a longitudinal direction of the wire harness;

and a long protection tape to be spirally wound around an outer circumference of the conductive sheet wrapped around the wire harness.

With such structure, the electromagnetic shield is imparted by the conductive sheet, and the conductive sheet is surely fixed by the protection tape, and accordingly, the shielded wire harness can be manufactured, which is capable of performing a stable electromagnetic shield. Moreover, the protection tape is wound around the outer circumference of the conductive sheet, and accordingly, a diameter of the conductive sheet can be reduced, and the shielded wire harness can be thinned in diameter. Furthermore, connection between the ground wire included in the wire harness and the conductive sheet is made in the longitudinal direction, and accordingly, electromagnetic shielding properties can be enhanced.

A method for manufacturing a shielded wire harness according to a second aspect of the present invention includes: wrapping a conductive sheet around a wire harness in a parallel state to the wire harness, the conductive sheet having a long belt shape along a longitudinal direction of the wire harness, and cutting the conductive sheet in matching with a desired electric wire length; and spirally winding a long protection tape around an outer circumference of the conductive sheet wrapped around the wire harness, and cutting the protection tape in matching with the desired electric wire length.

With such a configuration, the shielded wire harness with structure in which the conductive sheet covers the wire harness and the protection tape fixes the conductive sheet to the wire harness can be manufactured with ease.

Moreover, at this time, an adhesive surface formed on a back surface side of the protection tape may fix the conductive sheet to the wire harness by spirally winding the protection tape around the outer circumference of the conductive sheet.

With such a configuration, the conductive sheet can be surely fixed to the wire harness.

Moreover, the protection tape may be set at a predetermined width, and in spirally winding the protection tape around the outer circumference of the conductive sheet, the protection tape may be wound in a state of being inclined at a predetermined angle with respect to an axis in the longitudinal direction of the wire harness so that side portions of adjacent wound portions of the protection tape overlap one another.

With such a configuration, the protection tape can be robustly fixed, whereby the conductive sheet can be surely fixed to the wire harness.

The shielded wire harness to be manufactured by the method according to a second aspect of the present invention may be a shielded wire harness for a vehicle, the shielded wire harness being obtained by cutting the wire harness to a desired length, treating a terminal end of the wire harness and crimping a terminal to the terminal end, and thereafter, wrapping the conductive sheet and the protection tape around the wire harness.

BRIEF DESCRIPTION OF DRAWINGS

FIG. 7A is a front view explaining a first wrapping hook.

FIG. 7B is a front view explaining a second wrapping hook.

FIG. 8 is a perspective view illustrating a state of supplying the wire harness and the conductive sheet to the wrapper.

DESCRIPTION OF EMBODIMENTS

Figure 1:
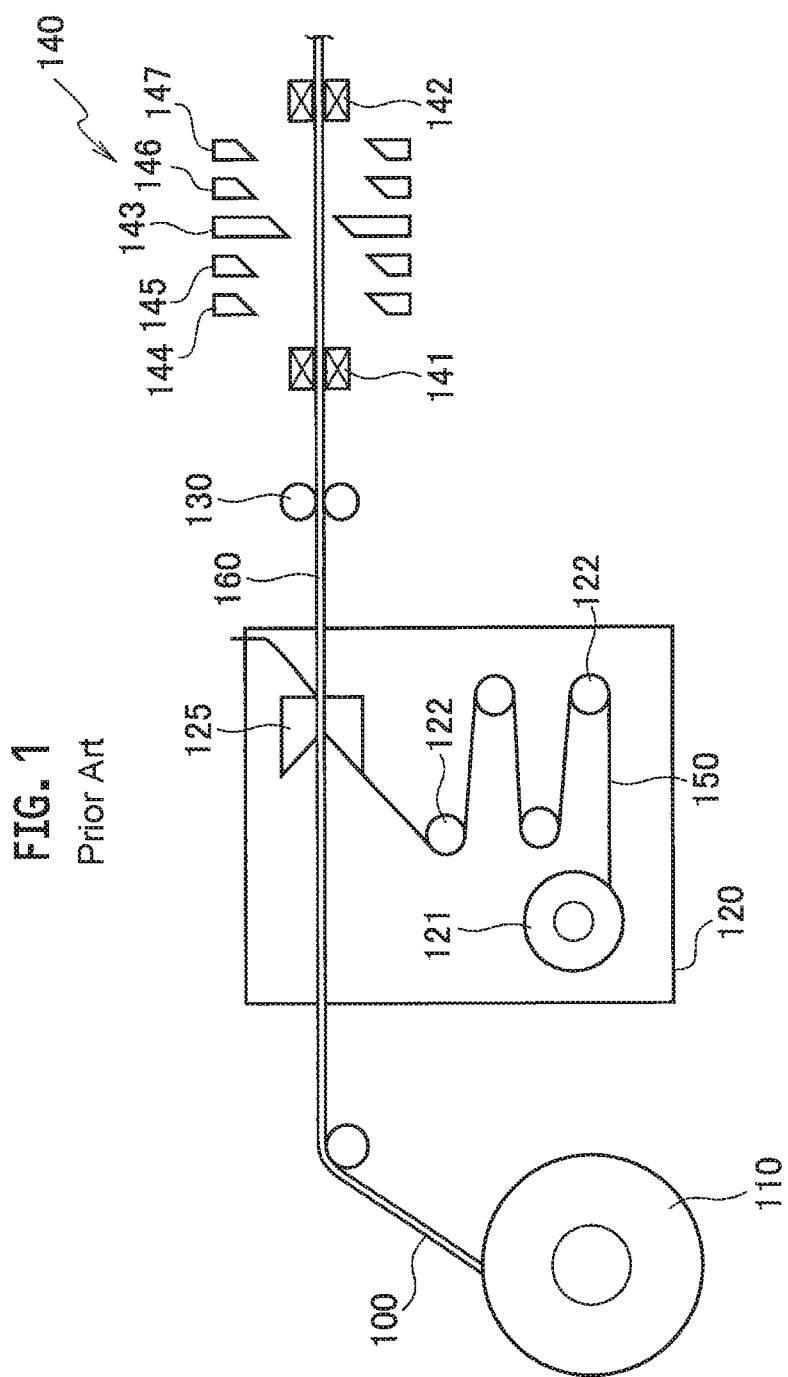
FIG. 1 is a front view illustrating a conventional manufacturing apparatus for use in manufacturing a shielded wire harness.

A description is made below of embodiments of the present invention while referring to the drawings.

Figure 2:
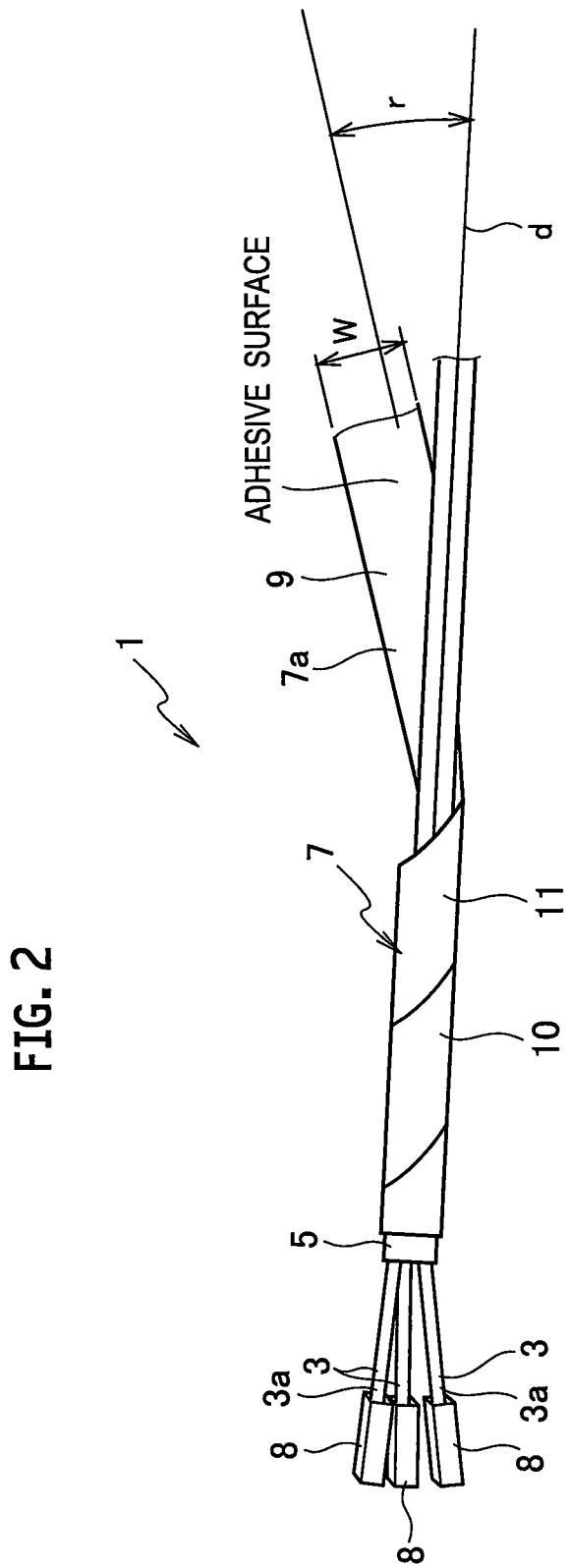
FIG. 2 is a perspective view of a shielded wire harness according to an embodiment of the present invention.

As illustrated in FIG. 2, a shielded wire harness 1 according to an embodiment of the present invention includes: a wire harness 3, which is composed of one or more electric wires and a ground wire; a conductive sheet 5 that covers the wire harness 3; and a protection tape 7 wrapped around an outer circumference of the conductive sheet 5.

Each wire of the wire harness 3 is formed in such a manner that a core wire is covered with an insulating cover (not illustrated). Terminal end 3a on one end side of the wire harness 3 is exposed from the conductive sheet 5, and each wire at the terminal end 3a is connected to a terminal 8. Though not illustrated, the terminal 8 includes: a core wire grip portion connected to the core wire of each wire of the wire harness 3 by crimping; and a cover grip portion fixed to the insulating cover of each wire of the wire harness 3 by crimping.

The conductive sheet 5 has a long belt shape along a longitudinal direction of the wire harness 3. The conductive sheet 5 is wrapped around the wire harness 3, thereby imparting electromagnetic shielding properties to the wire harness 3. The conductive sheet 5 has structure in which a resin layer made of insulating resin is stacked on metal foil such as aluminum foil and copper foil. The conductive sheet 5 covers the wire harness 3 in a state where the metal foil is located on the wire harness 3 side; however, may cover the wire harness 3 in a state where the resin layer is located on the wire harness 3 side. The conductive sheet 5 has a thin sheet shape, and accordingly, it is easy to bend the wire harness 3 even if the conductive sheet 3 is wrapped around and covers the wire harness 3. Therefore, no hindrance occurs in an operation of cabling the shielded wire harness 1 in an instrument.

Figure 3:
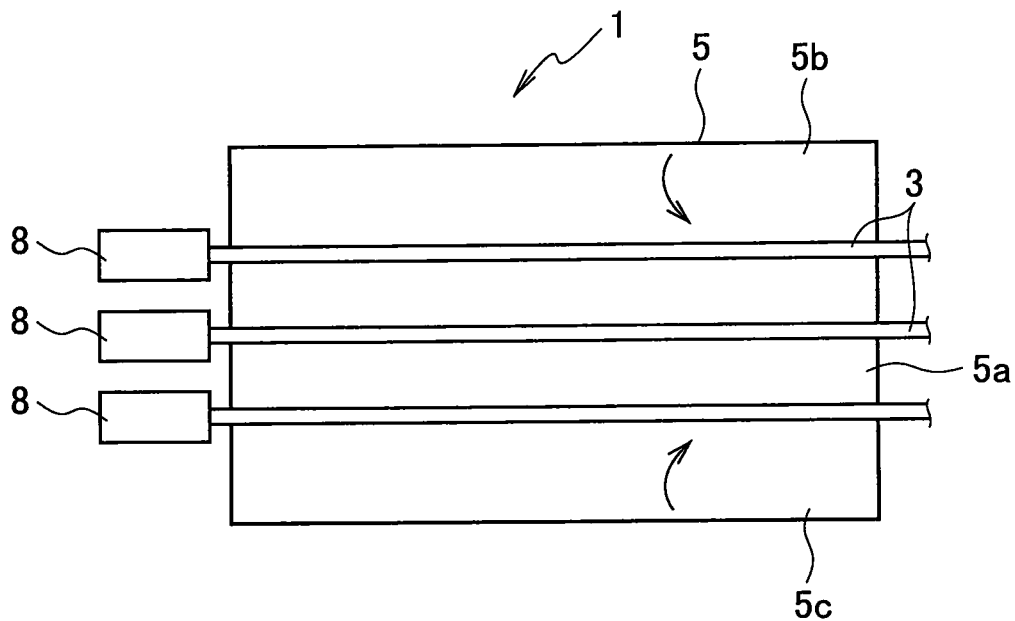
FIG. 3 is a plan view illustrating a state where the shielded wire harness is developed.

As illustrated in FIG. 3, the conductive sheet 5 is formed of: a sheet body 5a having a long belt shape; and sheet side portions 5b and 5c as both side portions in a longitudinal direction of the sheet body 5a. As the conductive sheet 5, a sheet having a larger width dimension than a total width of the wire harness 3. In a state where the sheet body 5a is parallel to the wire harness 3, the conductive sheet 5 is wrapped around the wire harness 3 so that the sheet side portions 5b and 5c as both side portions can overlap each other. In such a way, the shielded wire harness 1 is formed, in which the wire harness 3 is bundled.

Figure 4:
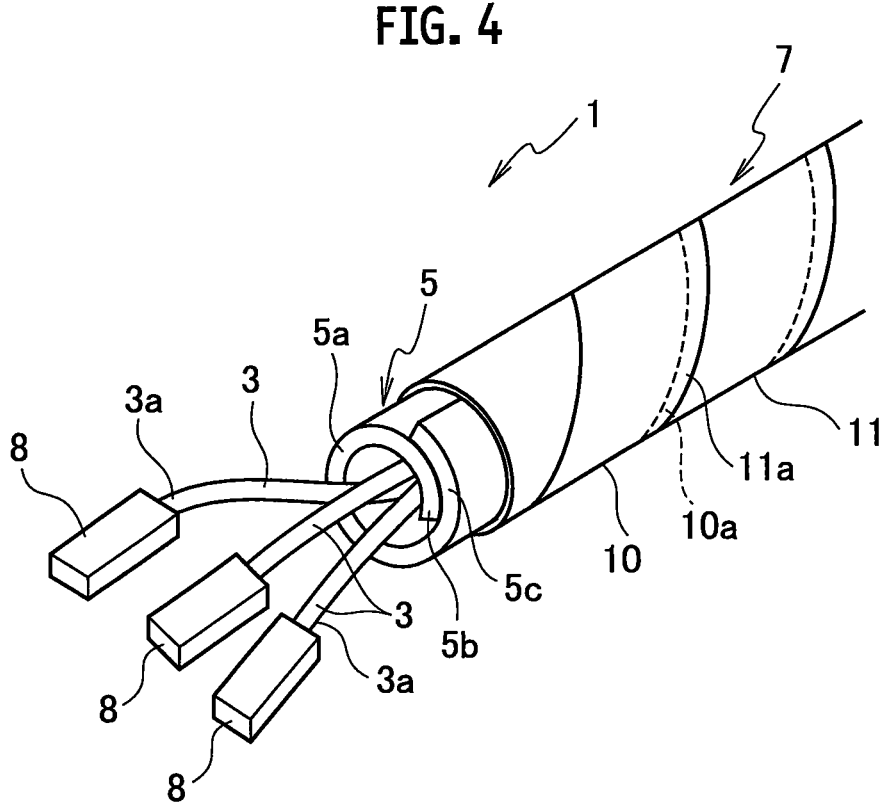
FIG. 4 is a perspective view illustrating the shielded wire harness.

In a state where the conductive sheet 5 is wrapped around the wire harness 3, as illustrated in FIG. 4, the conductive sheet 5 turns to a state where the sheet side portions 5b and 5c wrap the wire harness 3. Therefore, the conductive sheet 5 is wrapped around the wire harness 3, whereby sure electromagnetic shielding properties can be imparted to the wire harness 3.

As the protection tape 7, a flexible long tape having insulating properties is used. The protection tape 7 is wrapped around the outer circumference of the conductive sheet 5 wrapped around the wire harness 3 by being spirally wound therearound. A back surface 7a of the protection tape 7, which faces to the conductive sheet 5, is an adhesive surface 9 applied with an adhesive. In a state of directing the adhesive surface 9 of the protection tape 7 to the outer circumference of the conductive sheet 5, the protection tape 7 is spirally wound around the outer circumference of the conductive sheet 5 wrapped around the wire harness 3. In such a way, the adhesive surface 9 of the protection tape 7 fixes the conductive sheet 5 from the outer circumference thereof, and accordingly, the conductive sheet 5 can be surely fixed to the wire harness 3. Therefore, the shielded wire harness 1 is favorably shielded from an electromagnetic wave by the conductive sheet 5.

The protection tape 7 has a predetermined width W (refer to FIG. 2), and is spirally wound around the outer circumference of the conductive sheet 5 so that side portions of adjacent wound portions of the protection tape can overlap one another. Specifically, as illustrated in FIG. 4, the protection tape 7 is wrapped around the outer circumference of the conductive sheet 5 so that, between a first wound portion 10 in which the protection tape 7 is wound one time around the outer circumferential surface of the conductive sheet 5 and a second wound portion 11 in which the protection tape 7 is wound one time around the outer circumferential surface of the conductive sheet 5 subsequently to the first wound portion 10, a side portion 10a of the first wound portion 10 and a side portion 11a of the second wound portion 11 can overlap each other. As described above, the protection tape 7 is wrapped so that the side portion 10a of the first wound portion 10 and the side portion 11a of the second wound portion 11 can overlap each other, then the protection tape 7 is wound in a state of being inclined at a predetermined angle r with respect to an axis d in the longitudinal direction of the wire harness 3. The angle r can be selected as appropriate within a range of 30 degrees or less, preferably, of 20 to 10 degrees.

As described above, the shielded wire harness 1 is shielded from the electromagnetic wave by the conductive sheet 5, and the conductive sheet 5 is surely fixed by the protection tape 7. Therefore, the shielded wire harness 1 can be stably shielded from the electromagnetic wave. Moreover, the conductive sheet 5 is wrapped around the wire harness 3 in a parallel state thereto, and the protection tape 7 is spirally wound around the outer circumference of the conductive sheet 5, and the conductive sheet 5 is fixed to the wire harness 3. Therefore, a diameter of the conductive sheet 5 can be reduced. In such a way, the shielded wire harness 1 can be thinned in diameter. Moreover, contact between the ground wire (drain wire) of the wire harness 3 and the conductive sheet 5 becomes close in the longitudinal direction. Therefore, electromagnetic shielding performance of the shielded wire harness 1 is enhanced.

Next, a description is made of a method for manufacturing the shielded wire harness 1.

The shielded wire harness 1 is manufactured in such a manner that, after the conductive sheet 5 is wrapped around the wire harness 3 subjected to cutting and terminal end treatment (peeling, terminal crimping) in a parallel state along the longitudinal direction of the wire harness 3, the conductive sheet 5 is cut in matching with a desired electric wire length, and the protection tape 7 is spirally wound around the outer circumference of the conductive sheet 5 wrapped around the wire harness 3, and is cut in matching with the desired electric wire length. By the method as described above, the shielded wire harness 1, in which the conductive sheet 5 covering the wire harness 3 is fixed to the wire harness 3, can be manufactured with ease.

Moreover, the conductive sheet 5 is cut in matching with the desired electric wire length, whereby it becomes possible to expose the terminal end of the wire harness 3 from a cut portion of the conductive sheet 5, and to connect the terminal 8 to each wire at the terminal end of each wire of the wire harness 3, and it becomes unnecessary to remove the conductive sheet and the protection tape. In such a way, it becomes possible to manufacture the shielded wire harness 1 with a shape and a size, which correspond to each shield circuit, it becomes easy to fabricate and manage the shielded wire harness 1, and in addition, the terminal end treatment for the terminal, connector and the like can be automated. Moreover, the protection tape 7 just needs to be spirally wound around the outer circumference of the conductive sheet 5 after the wire harness 3 is covered with the conductive sheet 5, and accordingly, the manufacturing apparatus can be simplified. Therefore, the control and operation of the manufacturing apparatus at the time of manufacturing the shielded wire harness 1 become easy.

FIGS. 5 to 10B illustrate a wrapper 20 for wrapping the conductive sheet 5 along the longitudinal direction of the wire harness 3. On an upper portion of a device body 22 of the wrapper 20, a rapping groove 21 is formed, through which the wire harness 3 and the conductive sheet 5 are inserted. In the device body 22, a first wrapping hook 23 and a second wrapping hook 25 are arranged. These wrapping hooks 23 and 25 are arranged in order along a longitudinal direction of the wrapping groove 21. The first wrapping hook 23 is arranged on an upstream side in the wrapping groove 21, and the second wrapping hook 25 is arranged on a downstream side therein.

As illustrated in FIGS. 7A and 7B, each of the first wrapping hook 23 and the second wrapping hook 25 is formed into a hook shape, and on a wrapping groove 21 side thereof, circular-arc wrapping recessed portions 23a and 25a are formed. The first wrapping hook 23 and the second wrapping hook 25 are made rotationally movable with respect to the device body 22. The first wrapping hook 23 and the second wrapping hook 25 rotationally move individually in a falling direction, whereby the wrapping recessed portions 23a and 25a face to the wrapping groove 21, and press the conductive sheet 5 in the wrapping groove 21 from the above.

Figure 5:
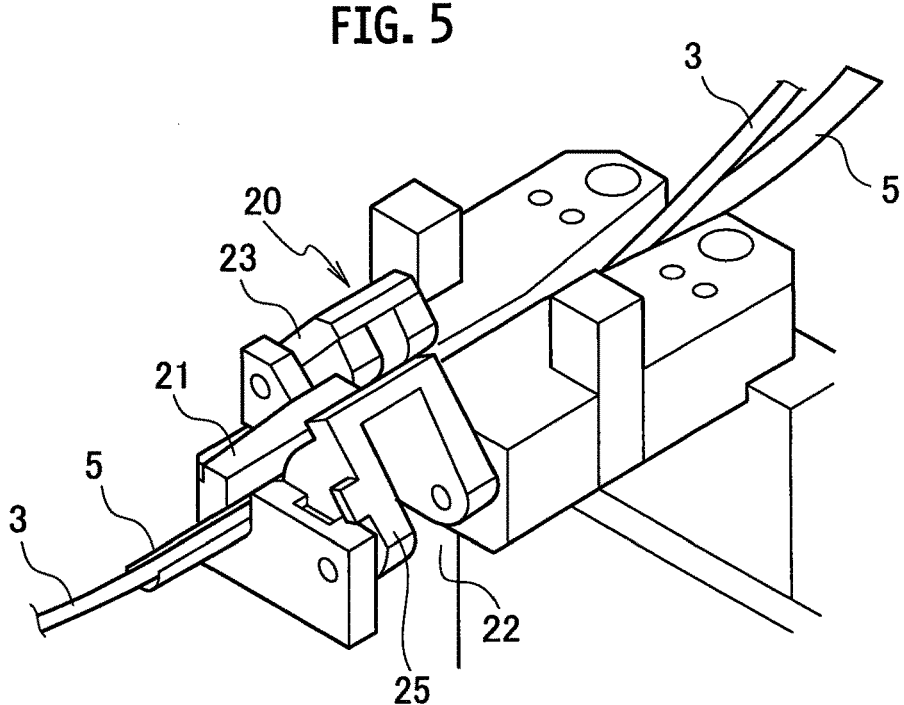
FIG. 5 is a perspective view illustrating a wrapper that wraps a conductive sheet around a wire harness.

FIG. 5 illustrates a state where an upper side of the wrapping groove 21 is made open in such a manner that both of the first wrapping hook 23 and the second wrapping hook 25 rotationally move in a rising direction. Into the wrapping groove 21, the conductive sheet 5 is inserted so as to form a U shape. The wire harness 3 is inserted into an inside of the conductive sheet 5. Note that, as illustrated in FIG. 9, each wire of the wire harness 3 is used for manufacturing the shielded wire harness 1 in a state where the terminal 8 is attached onto the terminal end thereof.

Figure 6:
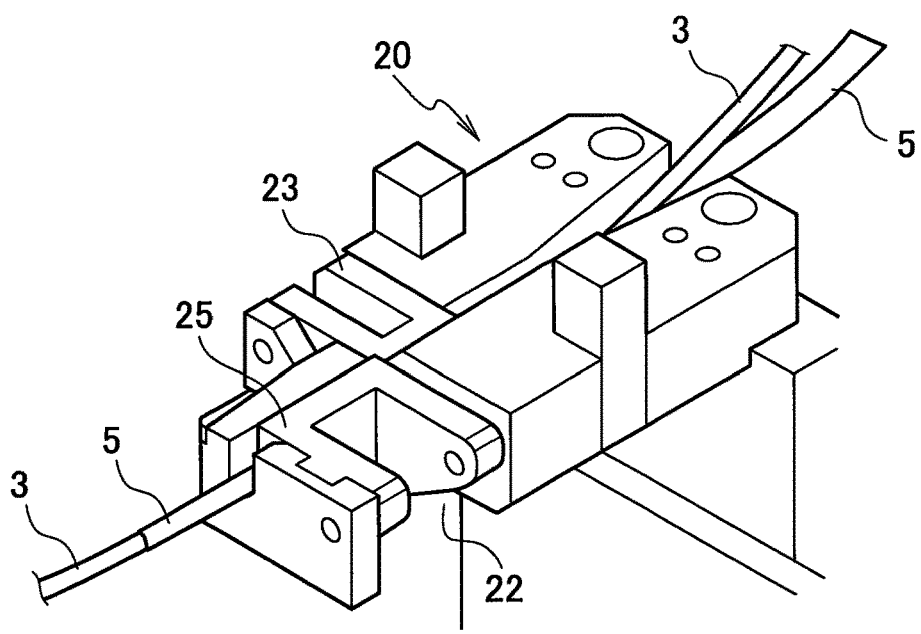
FIG. 6 is a perspective view of the wrapper, illustrating a state where wrapping hooks are rotationally moved to fall sideways.

FIG. 6 illustrates a state where the first wrapping hook 23 and the second wrapping hook 25 are rotationally moved in the falling direction. The first wrapping hook 23 on the upstream side rotationally move in the falling direction, whereby, as illustrated in FIG. 7A, the wrapping recessed portion 23a of the first wrapping hook 23 abuts against the conductive sheet 5 in the wrapping groove 21, and the sheet side portion 5b as one in a pair is bent in a direction of the wire harness 3. In such a way, the first wrapping hook 23 wraps the sheet side portion 5b as one in the pair so that the conductive sheet 5 can fold the wire harness 3. Moreover, as illustrated in FIG. 7B, the wrapping recessed portion 25a of the second wrapping hook 25 on the downstream side abuts against the conductive sheet 5 in the wrapping groove 21, and the sheet side portion 5c as the other in the pair is bent in the direction of the wire harness 3. In such a way, the second wrapping hook 25 wraps the sheet side portion 5c as the other in the pair in the conductive sheet 5 so that the sheet side portion 5c can overlap the sheet side portion 5b as one in the pair.

FIG. 8 illustrates a state where the wire harness 3 and the conductive sheet 5 are supplied in the longitudinal direction in the wrapping groove 21 in a state where the wrapping hooks 23 and 25 fall. As mentioned above, the first wrapping hook 23 and the second wrapping hook 25 bend the sheet side portions 5b and 5c of the conductive sheet 5 in the direction of the wire harness 3. Accordingly, the conductive sheet 5 turns to a state of being wrapped along the longitudinal direction of the wire harness 3, and is drawn out from the wrapping groove 21. When the conductive sheet 5 is drawn out to the desired electric wire length, a cutting blade 27 goes down, and forms a slit 28 at a desired position in the longitudinal direction of the conductive sheet 5.

Figure 9:
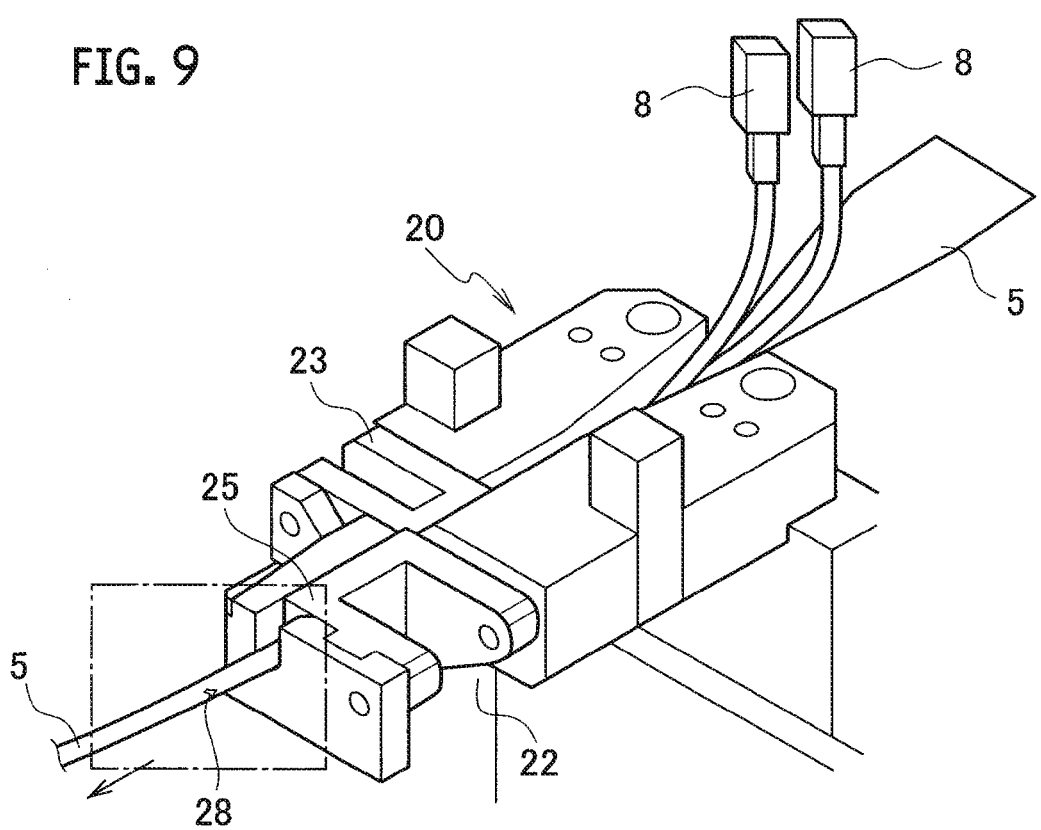
FIG. 9 is a perspective view illustrating treatment for the conductive sheet after being wrapped around the wire harness.
Figure 10A:
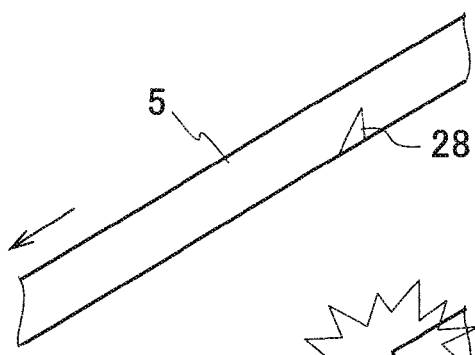
FIG. 10A is perspective views illustrating treatment for the conductive sheet.
Figure 10B:
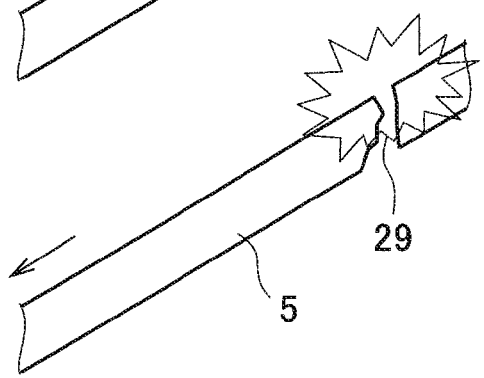
FIG. 10B is perspective views illustrating treatment for the conductive sheet.

Then, as illustrated in FIGS. 9 and 10A, the conductive sheet 5 is torn off at the slit 28 taken as a boundary. In FIG. 10B, reference numeral 29 denotes a torn-off portion obtained by tearing off the conductive sheet 5. The torn-off portion 29 can be defined as a position of a conductive sheet 5 to be set next. In such a way, the torn-off portion 29 can be located at the same position as a set position of the wire harness 3, and it becomes possible to shorten a cycle time.

What is claimed is:

1. A method for manufacturing a shielded wire harness, comprising:

wrapping a conductive sheet around a wire harness in a parallel state to the wire harness, the conductive sheet having a long belt shape along a longitudinal direction of the wire harness, overlapping both side portions of the conductive sheet each other by a first wrapping hook and a second wrapping hook of a wrapper, the first wrapping hook and the second wrapping hook arranged in order along the longitudinal direction, and cutting the conductive sheet to match with a desired electric wire length with a cutting blade;

allowing an adhesive surface formed on a back surface side of a protection tape to fix the conductive sheet to the wire harness by spirally winding the protection tape around an outer circumference of the conductive sheet wrapped around the wire harness; and cutting the protection tape to match with the desired electric wire length with the cutting blade, wherein wrapping the conductive sheet around the wire harness further comprises inserting the wire harness and the conductive sheet through a wrapping groove on an upper portion of a device body of the wrapper, and the first wrapping hook and the second wrapping hook are arranged in the device body of the wrapper and arranged in the order along a longitudinal direction of the wrapping groove such that the first wrapping hook is arranged on an upstream side in the wrapping groove and the second wrapping hook is arranged on a downstream side of the wrapping groove.

2. The method for manufacturing a shielded wire harness according to claim 1, wherein the protection tape is set at a predetermined width, and in spirally winding the protection tape around the outer circumference of the conductive sheet, the protection tape is wound in a state of being inclined at a predetermined angle with respect to an axis in the longitudinal direction of the wire harness so that side portions of adjacent wound portions of the protection tape overlap one another.

3. The shielded wire harness to be manufactured by the method according to claim 1, wherein the shielded wire harness is a shielded wire harness for a vehicle, the shielded wire harness being obtained by cutting the wire harness to a desired length, treating a terminal end of the wire harness and crimping a terminal to the terminal end, and thereafter, wrapping the conductive sheet and the protection tape around the wire harness.

4. The method for manufacturing a shielded wire harness according to claim 1, wherein:

each of the first wrapping hook and the second wrapping hook is formed into a hook shape having circular-arc wrapping recessed portions formed on a wrapping groove side thereof, and the first wrapping hook and the second wrapping hook rotationally move with respect to a longitudinal axis of the device body individually in a falling direction, whereby the wrapping recessed portions face the wrapping groove, and press the conductive sheet in the wrapping groove from above.

5. The method for manufacturing a shielded wire harness according to claim 4, wherein:

from a state in which an upper side of the wrapping groove is made open such that both the first wrapping hook and the second wrapping hook rotationally move in a rising direction, the conductive sheet is inserted into the wrapping groove, and the wire harness is inserted into an inside of the conductive sheet.

6. The method for manufacturing a shielded wire harness according to claim 5, wherein, after insertion of the wire harness into the inside of the conductive sheet:

the first wrapping hook rotationally moves in the falling direction, whereby, the wrapping recessed portion of the first wrapping hook abuts against the conductive sheet in the wrapping groove, and a first sheet side portion of the conductive sheet is bent in a direction of the wire harness such that the first wrapping hook wraps the first sheet side portion of the conductive sheet to fold over the wire harness, and the second wrapping hook rotationally moves in the falling direction, whereby, the wrapping recessed portion of the second wrapping hook abuts against the conductive sheet in the wrapping groove, and a second sheet side portion of the conductive sheet is bent in the direction of the wire harness such that the second wrapping hook wraps the second sheet side portion of the conductive sheet to fold over the first sheet side portion of the conductive sheet and the wire harness.

* * * * *